United States Patent [19]

Strehlow

[11] Patent Number: 4,865,457

[45] Date of Patent: Sep. 12, 1989

[54] CONCRETE BATCHER WITH SEGMENTED ENTRY OF MIXING INGREDIENTS

[75] Inventor: Robert W. Strehlow, New Berlin, Wis.

[73] Assignee: Mixer Systems Inc., Pewaukee, Wis.

[21] Appl. No.: 91,996

[22] Filed: Sep. 2, 1987

[51] Int. Cl.[4] .......................... B28C 7/06; B28C 7/12; B28C 5/14; G01G 13/02

[52] U.S. Cl. ........................................ 366/18; 222/77; 222/556; 366/40; 366/64

[58] Field of Search .................... 366/8, 17, 18, 19, 35, 366/40, 20, 141, 192, 64; 177/59, 199; 222/77, 129, 132, 548, 553, 485, 504, 502, 185, 460, 462, 556, 544

[56] References Cited

U.S. PATENT DOCUMENTS

| | | | |
|---|---|---|---|
| 991,765 | 5/1911 | Waterman | 137/595 X |
| 1,737,522 | 11/1929 | Scott | 366/40 |
| 2,527,147 | 10/1950 | Noble | 222/77 X |
| 2,527,761 | 10/1950 | Polak | 366/64 |
| 2,694,515 | 11/1954 | Green | 222/556 X |
| 3,218,044 | 11/1965 | Domenighetti | 366/18 |
| 3,905,586 | 9/1975 | Wall, Jr. | 366/18 |
| 4,075,711 | 2/1978 | Hall | 366/64 X |
| 4,435,081 | 3/1984 | Del Fabbro | 366/18 |
| 4,588,299 | 5/1986 | Brown et al. | 366/8 |
| 4,660,990 | 4/1987 | Svensson | 366/141 X |

*Primary Examiner*—Philip R. Coe

*Assistant Examiner*—Scott J. Haugland

[57] ABSTRACT

A concrete mixing apparatus including a paddle type mixer and a cement and water container mounted on a scale. The cement and water container is divided into separate cement and water compartments mounted above and upon the mixer to permit gravity flow of their contents through an open top portion of the mixer. Aggregate is supplied by a belt conveyor through a side opening. All ingredients are supplied by weight based on the indication of the scale. The scale includes load cells supporting the mixer. The arrangement provides flexibility in the manner of introduction of cement, water, and aggregate into the mixer.

5 Claims, 3 Drawing Sheets

CONCRETE BATCHER WITH SEGMENTED ENTRY OF MIXING INGREDIENTS

BACKGROUND

This invention relates to concrete batching and mixing plants in which quantities of materials are proportioned by weight and then mixed for use in making concrete structures. These plants are arranged to be set up in accessible locations and are designed for relatively small productive capacity.

It is an object of this invention to reduce the cost of such equipment and to simplify its function so that malfunction is unlikely to occur. The construction enables rapid production of concrete batches, flexibility as to mode of operation, and ease of control. Accuracy of control results in improved quality of concrete and consistency between batches.

In the mixing of concrete, it is customary in the batching plant to provide a silo for storing cement and suitable bins for various types of sand and other aggregates. One or more types of aggregates are selected for each type of concrete being furnished and the proportion of them in relation to the quantity of cement used determines the quality and other characteristics of the concrete product.

Generally the strength of the concrete is enhanced by reducing the quantity of water, but unless sufficient water is used, it is difficult to adequately mix the concrete and also to place it in various locations.

It has been proposed in the past to place the mixer on a scale (most commonly a load cell) and separately weigh the ingredients on the same scale as they are collected in the mixer or in hoppers integrally supported on the mixer so that a correctly proportioned batch of ingredients is assembled for mixing.

With these weighing arrangements, it was essential to weigh each ingredient separately. This required that each ingredient be fed separately into the weighing apparatus. Also that the apparatus be capable of having the feed interrupted when the desired weight of each material has been accumulated. Accordingly, there was no flexibility in the manner of introduction into the mixer of the cement and water vis-a-vis the aggregates. Should the water and cement be introduced first, stirring them together in the mixer can cause "balling", which is the creation of balls of cement and water. These balls are difficult to break up and cause a delay in production of a smooth, even mixture of concrete.

If each ingredient is introduced separately into the mixer, it is necessary to establish a sequence for such introduction since it is necessary to separately determine the quantity of each. This limits the flexibility of the plant.

SUMMARY OF THE INVENTION

According to the present invention, separate compartments are provided in which water and cement are weighted and stored prior to the supplying of aggregates. These compartments are mounted above and upon the mixer so that their contents may be fed by gravity into the mixer, their weight when empty being added to the weight of the mixer and other structure permanently associated therewith. Transfer of these ingredients from their respective holding compartments may now occur at any time since this action has no effect on the further weighing of the ingredients.

To obtain a high degree of accuracy in weighing the water and cement, they are weighed at the start of the mixing cycle while there is little or no fluctuation due to the agitation caused by the aggregates after they are introduced into the mixer. Accordingly, after being weighed, they may be introduced concurrently with the supply of aggregates, and/or with either preceding the other. Difference in the type of cement and/or character of aggregates may make it desirable to alter the sequence of their introduction as will be hereafter explained.

In all cases it is desirable to have the mixing elements constantly rotating so that mixing can proceed as the ingredients are supplied and excessive loads are not imposed on the mixer. With a paddle type mixer it may be desirable to direct the water onto the blades as they emerge from the mixture to flush them off and prevent build-up of material. Generally, the operator of the plant will determine the sequence for charging the ingredients which is found to be most effective for the type of mixture being produced.

DETAILED DESCRIPTION OF THE INVENTION

Figure 1:
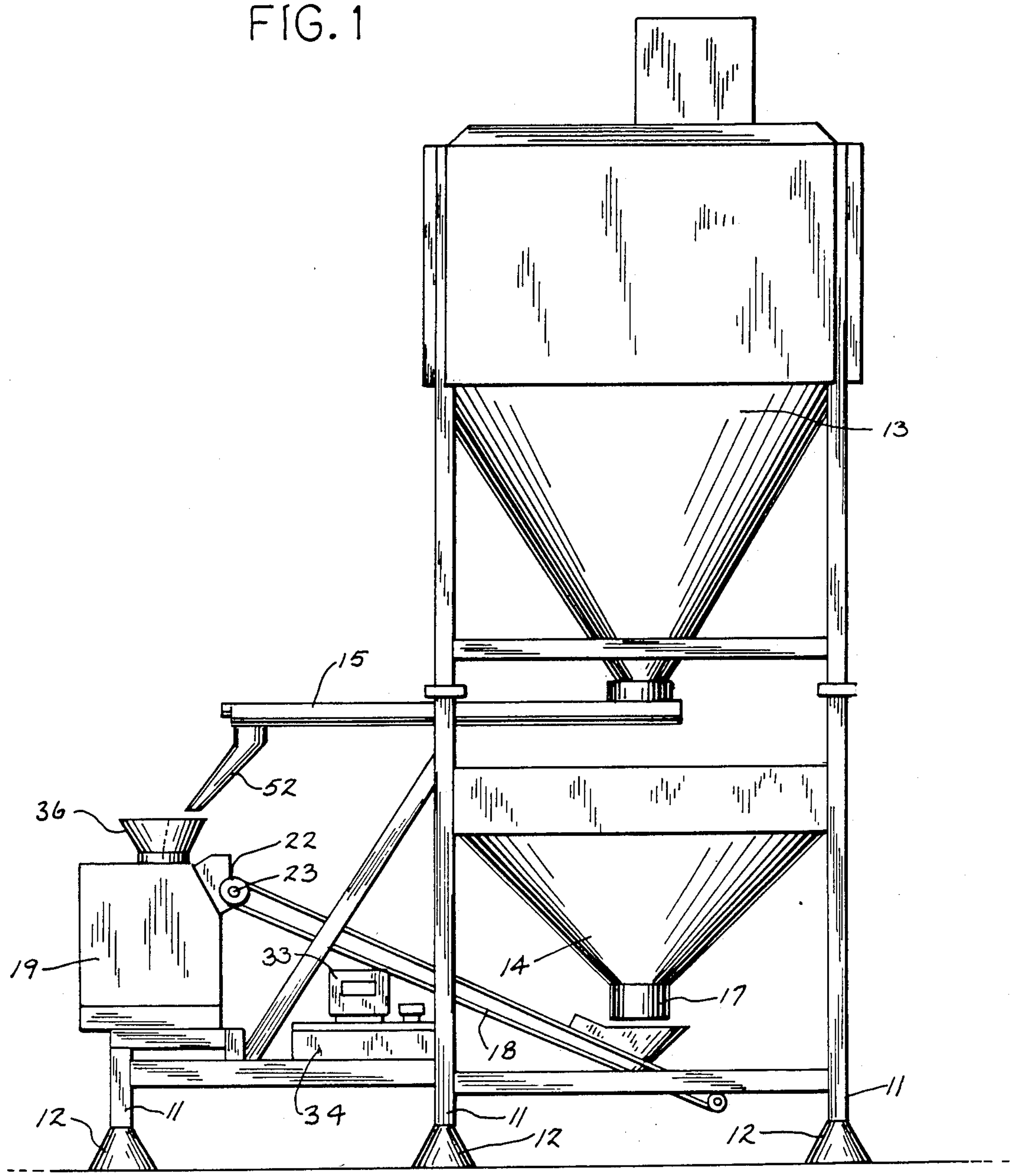
FIG. 1 is a schematic view of the concrete batching plant in which the present invention is embodied.

Referring to FIG. 1, the batching plant consists of the vertical columns 11 having foot portions 12 arranged to rest on a level foundation. The cement silo 13 which is supported by four of the columns 11 is disposed above the aggregate hopper 14. Cement may be fed to the silo by pneumatic means and is conducted from the silo by the screw conveyor designated 15. It will be understood that the discharge throat of the silo feeds directly into the screw conveyor and no gate is required between them. Feed from the screw conveyor can be interrupted by stopping the motor that operates the screw conveyor.

The aggregate hopper 14 is partitioned to provide two bins, one for say, sand, and the other, stone. A gate 17 at the bottom of the hopper can either be totally closed or moved to a position enabling discharge of either sand or stone. It is designed so only one bin can be discharged at a time since each has to be separately weighed. If the partition runs parallel to the front and back of the hopper, the compartments can be loaded by discharge over the adjacent side from the front or back of the plant.

Arranged beneath the gate 17 is an inclined belt conveyor 18, which is constantly running and conveys the aggregates directly into the mixer 19. The belt conveyor 18 is driven by a head pulley 22 mounted on a shaft 23. The shaft is driven by a torque arm speed reducer from a belt drive 24 connected to the motor shaft 25 located above the head pulley shaft 23.

The location of the head pulley 22 is such that the aggregate carried by the belt is discharged over the end of the pulley and falls directly through an opening in the upper portion of one side of the housing of the mixer 19.

The mixer itself is of the paddle type in that paddles 27 are rigidly mounted on hubs keyed on an axial drive shaft 28. The ends of the paddles are connected by spiral blades 29 which rotate in orbits closely adjacent the inside of the mixer housing. The construction of the mixer is conventional and well known in the art. Like the belt conveyor 18, the mixer is constantly running during the batch cycle. Discharge from the mixer is through a gate 30 into a cart or any suitable receiving receptacle. The gate is actuated by the power cylinder 31 and concrete passing therethrough falls into the chute 31' and hence to the receptacle.

Mixer 19 rests on four hermetically sealed load cells 32. A display indicator 33 is located on the platform 34 where it is clearly visable to the operator, who in turn can operate control means to interrupt the feed of ingredients as the desired weight of each is registered. The load cell used by applicant is the 8142 Dual Display model manufactured by Toledo Scale division of Reliance Electric Co., but other makes can be used for the same function.

Manual operation of the control means enables shut-off of the feed of these ingredients in a sufficiently accurate manner for the purpose required.

Since the control of the flow of aggregates is at the gate 17, and the belt 18 is running constantly, there will be some material on the belt when the gate is closed, the weight of which has to be anticipated and added to that shown at the moment the gate is closed. With manual, hand lever operated gate control, the gate may be feathered so the flow rate is practically zero just prior to the desired weight being obtained. With automatic controls, a pre-cut off compensation is employed. Generally, the operation can be such that it is accurate to the order of one pound.

Instead of feeding cement and water directly from their sources of supply into the mixer, a separate intermediate compartment is provided for each of them. As shown herein, there is actually only one container 36, which rests on the top of the mixer housing and is weighed along with the mixer and its contents.

Figure 3:
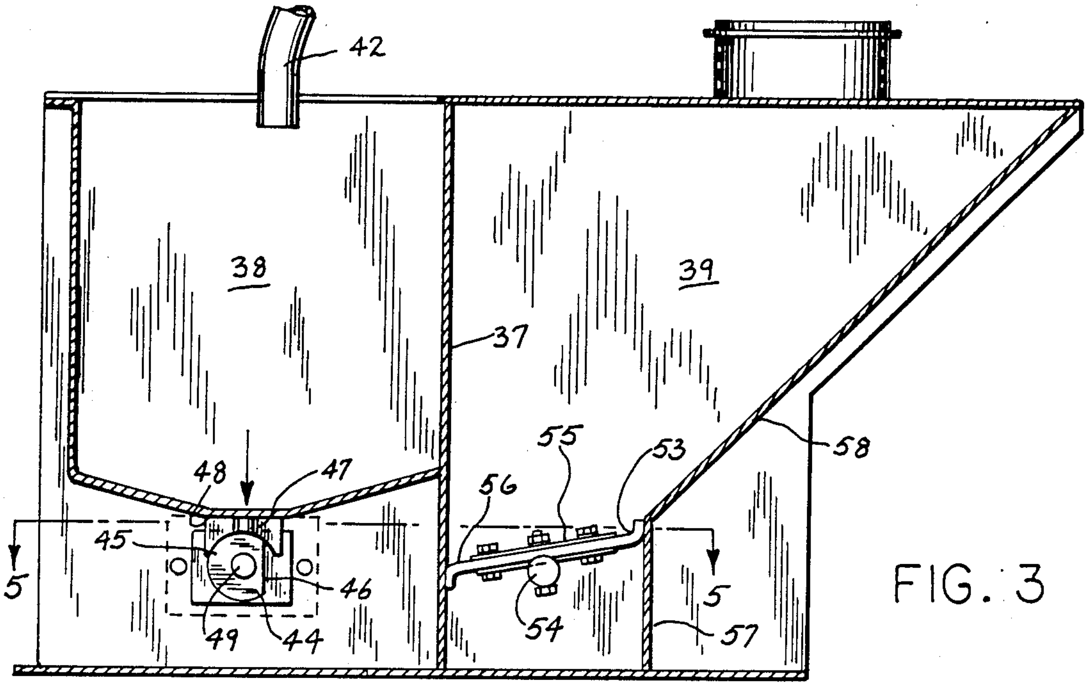
FIG. 3 is an enlarged view of the compartments shown in FIG. 2 including the gates for discharging the water and cement into the mixer.
Figure 4:
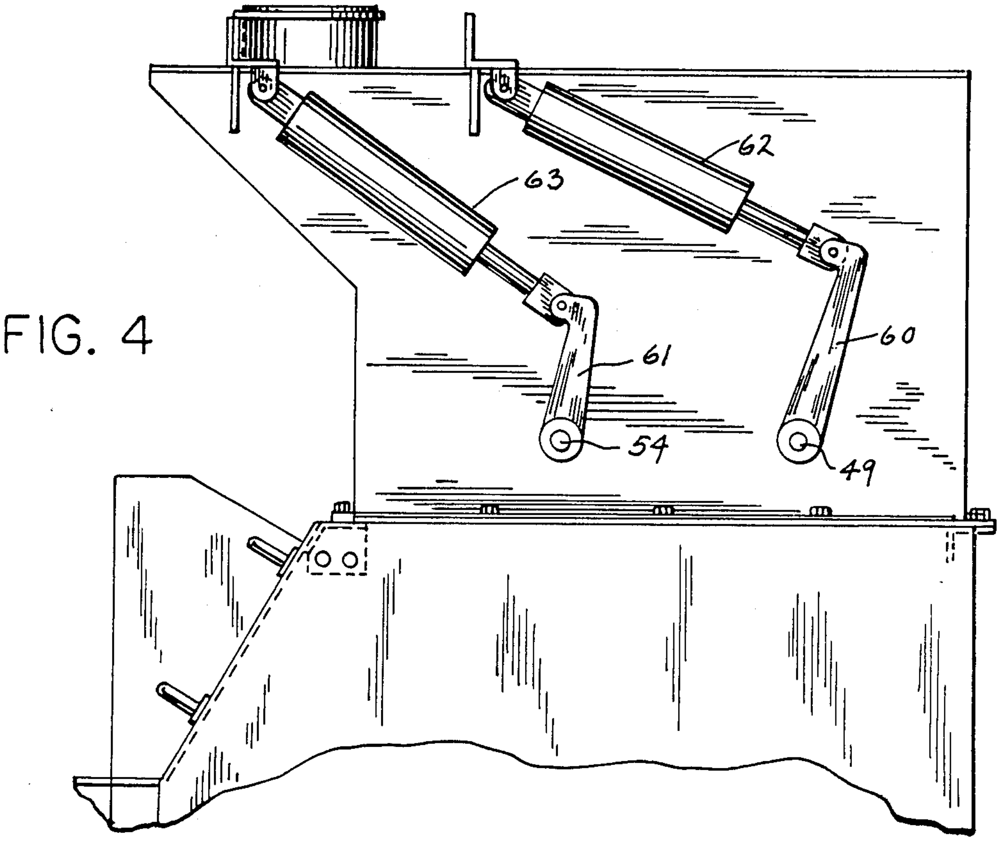
FIG. 4 is a view of the compartment shown in FIG. 3 taken from the opposite side and showing the hydraulic cylinders for actuating the cement and water discharge gates.

As shown in FIG. 3, partition 37 divides the container 36 into two compartments, one of which 38 is for water and the other 39, for cement. Water is supplied through the conduit 42 from a source of supply, a valve being remotely controllable by the operator to initiate and discontinue such supply. The lower portion of the compartment 38 is provided with a pair of identical outlet valves 44 each of which consists of a cylindrical plug 45 having a flat section 46 communicating with an inlet portion 47 extending through the valve housing 48. Plus 45 is mounted on a shaft 49 extending through the length of the compartments. One end of the shaft is mounted on a bearing in one of the ends of the compartment and the other end extends through the bearing in the other end.

The shaft 49 on which the water discharge valves 44 are mounted extends in a direction parallel to the shaft 28 on which the mixer paddles 27 are mounted. The discharge valves 44 are located near the ends of the shaft 49 so that discharge therefrom causes the water to fall on the end portions of the mixer. If the arrangement of paddle blades is such as to cause the material being mixed to move toward the center of the mixer, the water will be moved in the same direction causing an even distribution of the water in the mix.

As previously described, cement is discharged from the end of the screw conveyor 15 when the latter is running. The discharge of the conveyor 15 is fed through the receiving duct 52 into the top of the compartment 39 and it is constantly weighed on the scale until the desired amount is accumulated. In the same fashion, water is weighed as it is separately charged into compartment 38. Cement is discharged from compartment 39 through the gate valve 53, which consists of the gate plates 55 mounted on the shaft 54. The plates 55 consist of two strips of metal clamping a sealing strip 56 which is flexed against the sides of the discharge throat 57 of the compartment. Preferably, a vibrator (not shown) is mounted on the sloping side 58 of the compartment to assist in discharge of cement when the valve 53 is opened. The gate valve 53 provides an opening extending the full length of compartment 39. Accordingly, the cement is distributed evenly throughout the length of the mixer, which tends to prevent uneven distribution of cement in the final concrete mixture.

Figure 5:
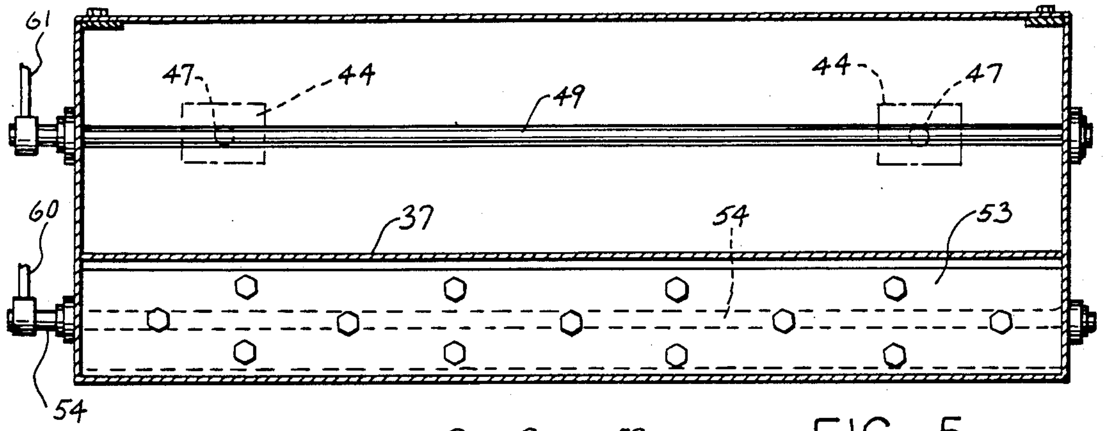
FIG. 5 is a section taken on line 5—5 of FIG. 4.
Figure 2:
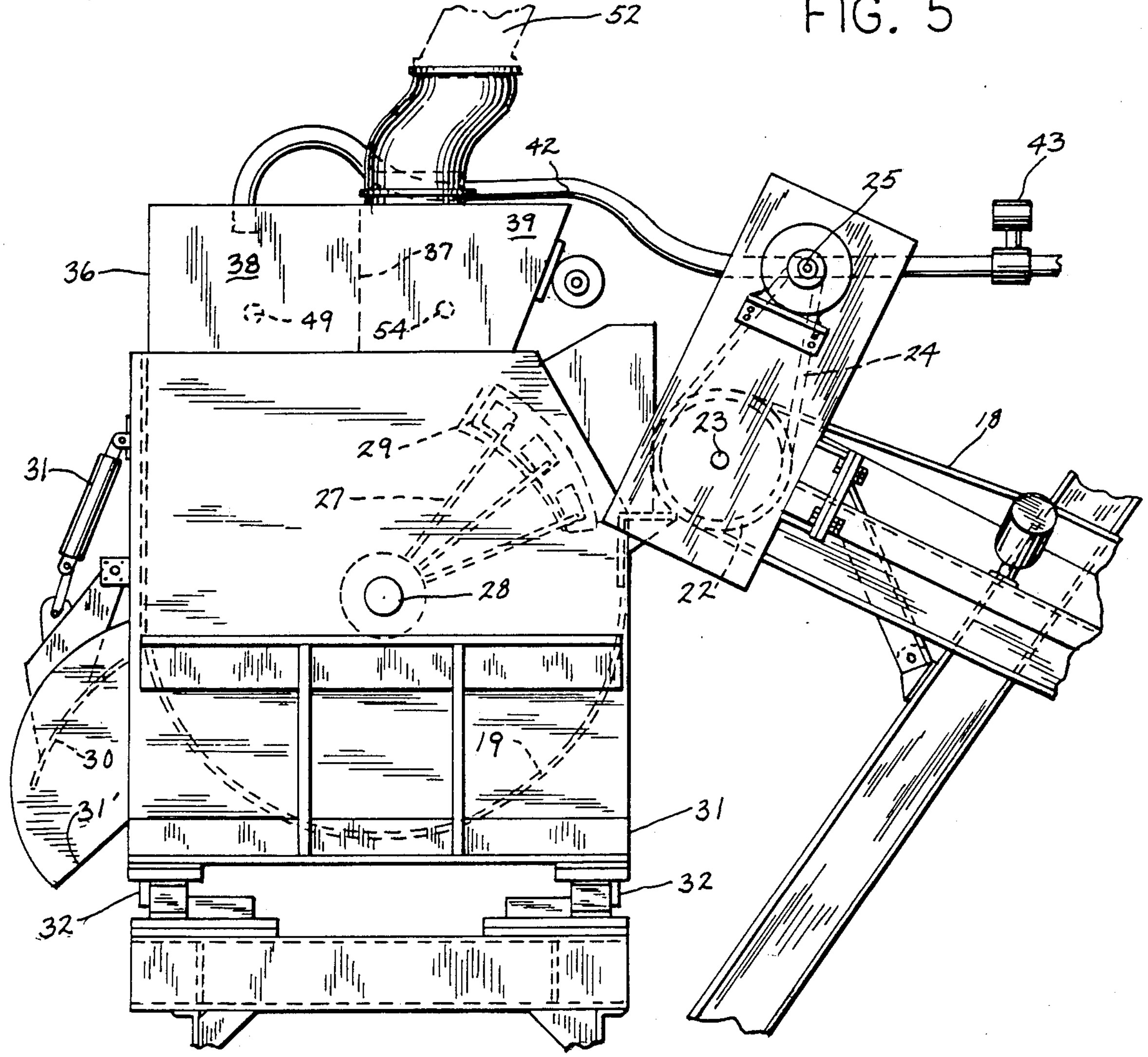
FIG. 2 is a side elevation of a portion of the apparatus showing an end view of the mixer and the compartment for storing pre-weighed amounts of cement and water.

As shown in FIG. 5, the length of the water compartment 38 is co-extensive with the length of the cement compartment, and since the length of the water compartment is also co-extensive with the length of the mixer, cement can be spread through all underlying portions of the mixer. With the water discharge openings 47 disposed near the ends of the water compartment, water may be discharged near the end portion of the mixer and can be moved with the aggregates toward the center of the mixer, as previously described; the result is a very desirable distribution of water and cement within the mixer.

Discharge through the gates from compartments 38 and 39 falls directly into the open top portion of the mixer. These gates can be opened at separate intervals of time, or concurrently, depending on the desired sequence for the most desirable mixing. The water for instance can be introduced concurrently with either of the aggregate and so can the cement. Since they are pre-weighed individually, it is possible to use the same weighing device while providing maximum flexibility in the sequence of their introduction into the mixing compartment.

Normally it would be desirable to weigh the water and cement prior to introduction of aggregates because the mixer is more stable when it is empty and more accurate weights can be obtained. If weighing of the cement or water occurs after the aggregates have been fed into the mixer, the operation of the mixer causes some bouncing of the scale and fluctuation of the weights.

The shafts 49 and 54 extend through the back wall of the compartments 38 and 39, as shown in FIG. 3, and each is engaged by lever arms 60 and 61 respectively. These arms are manually actuated or as shown here by cylinders 62 and 63, controls for which can be located at the control station 33.

The invention having been described, what is claimed is:

1. Apparatus for producing a mixture of the desired amounts of water, cement and aggregates suitable for a batch of concrete, said apparatus comprising a scale with means for registering weights accumulated thereon, a mixer supported by the scale having an open upper portion for receiving the materials to be mixed and a discharge gate through which the mixed concrete and be expelled, a first compartment mounted on the mixer into which water is accumulated until the desired amount by weight is contained therein, a second compartment also supported by the mixer into which content is accumulated until the desired amount by weight is contained therein, conveyor means for charging a quantity of aggregates into the mixer, means for discontinuing the supply of aggregate when the weight added thereby to the scale reading reaches the desired amount, means for supplying water and cement to said first and second compartments respectively, and controllable means for discharging the accumulated quantities of water and cement from their respective compartments into the mixer where they can be mixed with each other and with the aggregates.

2. The apparatus as set forth in claim 1, characterized by the arrangement permitting the water and/or cement to be introduced into the mixer concurrently with the aggregates.

3. Apparatus as set forth in claim 1 in which the length of the first mentioned water containing compartment is co-extensive with the length of the mixer, a shaft extending through the compartment, and valves mounted on the shaft adjacent its ends arranged to discharge water from the compartment into spaced portions of the mixer.

4. Apparatus as set forth in claim 1, in which the two compartments are arranged side by side, have common end walls and are co-extensive with the length of the mixer and in which each compartment is provided with a discharge gate feeding directly into the mixer, shafts on which said gates are mounted, said shafts extending through one of the common end walls and means for rotating the shafts to open the gates concurrently or sequentially.

5. Apparatus as set forth in claim 1 including means for agitating materials in the mixer, and means for controlling the supply of water and cement to their respective holding compartments whereby each may be separately weighed without distortion occurring because of the action of the agitating means, the mixer being empty while the cement and water are weighed.

* * * * *